Dec. 18, 1923.
B. F. SEYMOUR
1,477,909
RESILIENT TRANSMISSION AND BEARING
Filed June 7, 1919    2 Sheets-Sheet 1
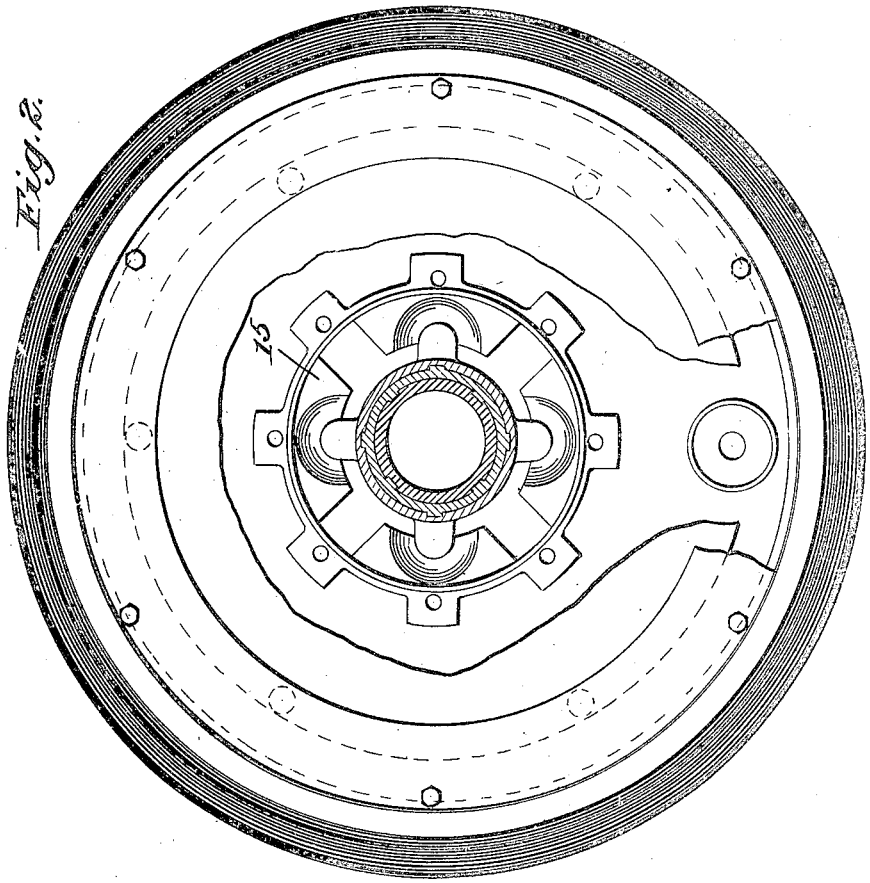
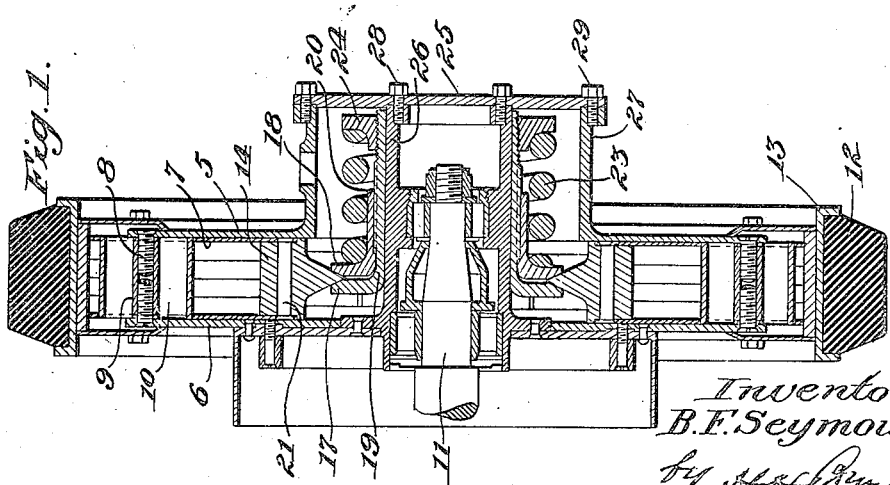
Inventor:
B. F. Seymour, Dec. 18, 1923.
B. F. SEYMOUR
1,477,909
RESILIENT TRANSMISSION AND BEARING
Filed June 7, 1919     2 Sheets-Sheet 2
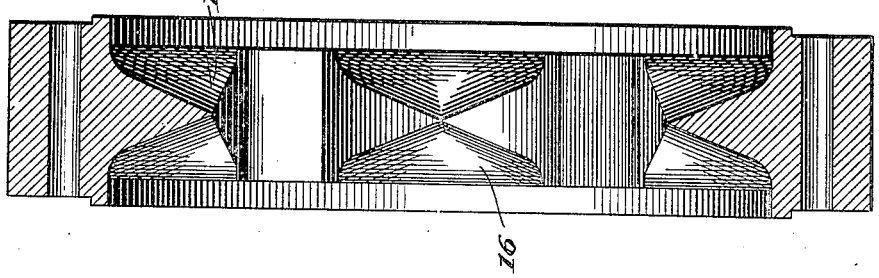
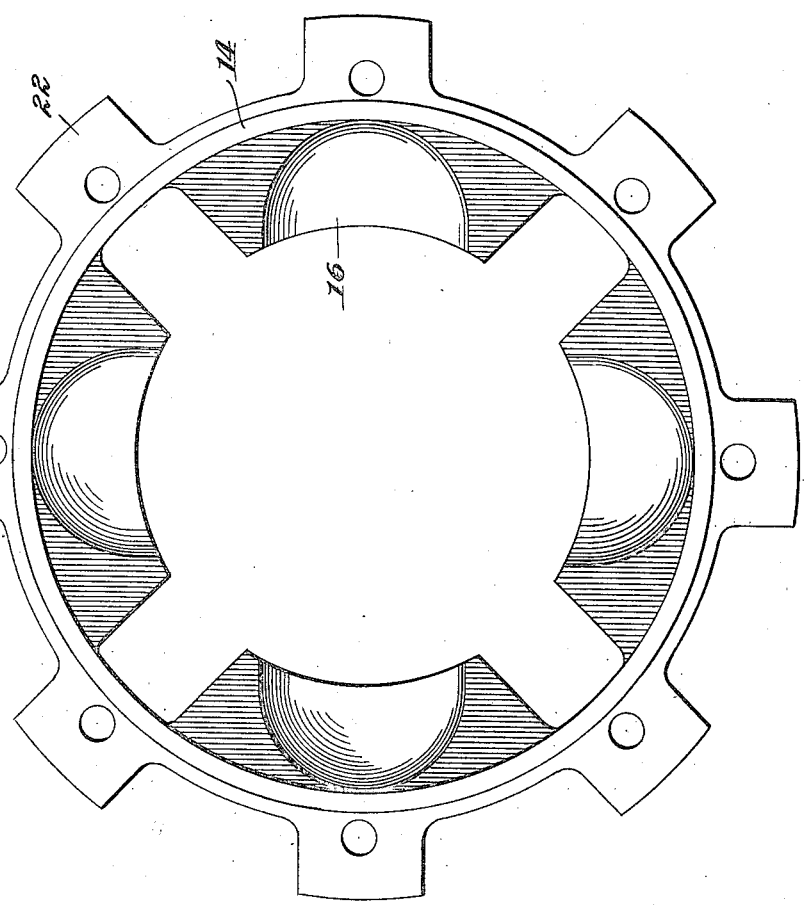
Inventor:
B. F. Seymour,
Atty.

Patented Dec. 18, 1923.

1,477,909

UNITED STATES PATENT OFFICE.

BENJAMIN F. SEYMOUR, OF WASHINGTON, DISTRICT OF COLUMBIA.

RESILIENT TRANSMISSION AND BEARING.

Application filed June 7, 1919. Serial No. 302,415.

*To all whom it may concern:*

Be it known that I, BENJAMIN F. SEYMOUR, a citizen of the United States, residing at Washington, in the District of Columbia, have invented certain new and useful Improvements in Resilient Transmissions and Bearings; and I do hereby declare the following to be a full, clear, and exact description of the invention, such as will enable others skilled in the art to which it appertains to make and use the same.

The present invention relates to resilient transmissions and bearings, more particularly for vehicle wheels, and consists in the combinations and arrangements of elements hereinafter described and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel may possess the desired resilient qualities and also give the necessary transmission medium between the wheel proper and the motive power of the vehicle.

The invention is shown by way of illustration in the accompanying drawings wherein, Figure 1 is a central sectional view of a vehicle wheel equipped with the device, Figure 2, an elevational view thereof, with the hub portion in section, Figure 3, is an enlarged detail view of one of the transmission and bearing members, and Figure 4 is a central sectional view of the same.

Referring to the construction in further detail and wherein reference characters designate corresponding parts, the construction consists of a hub portion formed of two side plates, or housing members, 5 and 6, which provide annular bearing portions disposed against the inner rim portion 7 of the wheel as shown. The two hub members 5 and 6 are secured to the wheel rim by the series of bolts 8 that screw into the tubes 9 located within the chambers, or spaces, 10 as indicated in Figure 1. It will be understood of course that said spaces, or chambers, are provided to allow the wheel rim to have limited radial movement with respect to the axis 11 of the wheel.

A tire 12 is mounted on the flanged rim portion 13.

The resilient transmission and bearing device per se consists of an annular body or ring portion 14 having a plurality of segmental portions 15 centrally disposed and each of said segmental portions 15 is cut away on opposite faces (see Figures 3 and 4) to form an annular series of cone segments or cam surfaces 16 disposed on opposite sides of the wheel and designed to operate with the several segments of cone heads, or dogs, 17 and 18 that are formed on the two telescoping sleeve members 19 and 20, as shown (see Figure 1). Said cone elements 16 and 17 provide an annular series of contacting portions or engaging surfaces for transmitting turning movement to the wheel rim from the axle driven hub. In like manner do they provide for limited relative radial movement between the wheel rim and hub.

The ring 14 is suitably secured to the side portions of the wheel rim 7 by the series of bolts 21, (or other suitable device) that pass through said rim portion 7 to the radially disposed lugs 22 of said ring, as shown.

The two sleeves 19 and 20 carrying the cone heads 17 and 18 respectively are mounted on hub member 26 and are normally held in operative position by a spring 23 that seats against the cone heads 18 of the sleeve 20 and against the collar 24 which is screw-threaded on sleeve 19, as shown. The collar 24 is adapted to be adjusted for regulating the tension of the spring and to this end the closure, or cover, plate 25 is removably secured to the hub member 26 and housing flange 27 by the several bolts 28 and 29, as shown.

It will therefore be seen from the foregoing, that any turning of the shaft, or axle, 11 will transmit a like movement to the wheel rim through the medium of the cooperating cam elements and that such transmission will be flexible or resilient in nature. And it will be further seen that any jarring action imparted to the wheel will be taken up by the cooperating cam elements working against the tension of the spring 23.

It will be obvious of course that different forms of construction may be provided in lieu of that disclosed and described herein. And while I have shown and described certain apparatus for accomplishing the result initially stated it is to be understood that I am not limited to the precise details shown but may on the other hand adopt modifications or changes within the scope of the claims to better suit the end in view.

Having thus described my invention, what I claim is:

1. In a combined resilient bearing and transmission for vehicle wheels, the combination of a sleeve member slidable on the wheel hub, a wheel rim, said sleeve and wheel rim having a plurality of segmental and cooperable cone elements, and a spring mounted on said sleeve normally holding said segmental cone elements in frictional engagement and providing a resilient bearing and transmission for the wheel rim, substantially as set forth.

2. In a combined resilient bearing and transmission for vehicle wheels, the combination of telescoping sleeve members, a wheel rim, said wheel rim having a plurality of cone segments formed on opposite sides thereof, said sleeves having portions complemental to said cone segments and in contact therewith, and a spring mounted on the sleeves holding said cone elements in frictional engagement and providing a bearing and transmission for the wheel rim, substantially as set forth.

3. In a combined resilient bearing and transmission for vehicle wheels, the combination of telescoping sleeve members, a wheel rim mounted to have radial movement thereon, said rim provided with a plurality of segmental members having cone segments on opposite sides thereof, said sleeves having opposed cone portions engaging with said rim cone segments, and a spring mounted on said sleeves and holding said cone elements in operative position and providing a bearing and transmission for the wheel rim, substantially as set forth.

In testimony whereof I affix my signature.

BENJAMIN F. SEYMOUR.